United States Patent
Kashima et al.

(10) Patent No.: US 6,906,764 B2
(45) Date of Patent: Jun. 14, 2005

(54) REFLECTIVE CHOLESTERIC FILTER

(75) Inventors: Keiji Kashima, Shinjuku-Ku (JP);
Yukihiro Toyota, Shinjuku-Ku (JP);
Masanori Umeya, Shinjuku-Ku (JP);
Mariko Goto, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/277,868

(22) Filed: Oct. 23, 2002

(65) Prior Publication Data

US 2003/0038918 A1 Feb. 27, 2003

Related U.S. Application Data

(63) Continuation of application No. 09/549,615, filed on Apr. 14, 2000, now abandoned.

(30) Foreign Application Priority Data

| Apr. 20, 1999 | (JP) | 11-111998 |
| Apr. 21, 1999 | (JP) | 11-113675 |
| Apr. 21, 1999 | (JP) | 11-113676 |
| Mar. 10, 2000 | (JP) | 2000-66645 |
| Mar. 23, 2000 | (JP) | 2000-81444 |

(51) Int. Cl.⁷ ............................................. G02F 1/13
(52) U.S. Cl. .......................... 349/98; 349/176; 349/194
(58) Field of Search ........................... 349/176, 98, 115, 349/194

(56) References Cited

U.S. PATENT DOCUMENTS

| 3,679,290 A | 7/1972 | Adams et al. |
| 3,711,181 A | 1/1973 | Adams, Jr. et al. |
| 3,726,584 A * | 4/1973 | Adams et al. ................. 349/19 |
| 3,909,114 A | 9/1975 | Haas et al. |
| 4,679,911 A | 7/1987 | Jacobs et al. |
| 5,506,704 A | 4/1996 | Broer et al. |
| 5,627,666 A | 5/1997 | Sharp et al. |
| 5,691,789 A | 11/1997 | Li et al. |
| 5,825,543 A | 10/1998 | Ouderkirk et al. |
| 5,827,449 A | 10/1998 | Hanelt et al. |
| 6,433,853 B1 * | 8/2002 | Kameyama et al. ......... 349/176 |
| 6,624,872 B2 * | 9/2003 | Anderson et al. ........... 349/194 |

FOREIGN PATENT DOCUMENTS

| DE | 196 19 460 A1 | 11/1997 |
| EP | 0 404 462 A2 | 12/1990 |
| EP | 0 491 551 A2 | 12/1991 |
| EP | 0 860 716 A2 | 8/1998 |
| EP | 0 881 510 A2 | 12/1998 |
| WO | WO 94/10589 | 5/1994 |

OTHER PUBLICATIONS

Cholesteric liquid crystdal mirrors for pulsed solid state lasers, Grebe et al, 1995.*

Bragg Reflection from liquid crystal layers, St. John et al, Phys Review 1995.*

Haeberle N. et al., "Right and Left Circular Polarizing Colorfilters Made From Crosslinkable Cholesteric LC–Silicones" Proceedings of the International Display Research Conference, New York, vol. Conf. 11, Oct. 15, 1991.

European Office Action dated Dec. 6, 2002 in European Application No. 00 108 570.3.

* cited by examiner

*Primary Examiner*—Kenneth Parker
(74) *Attorney, Agent, or Firm*—Oliff & Berridge, PLC

(57) ABSTRACT

A polarized light extraction optical element is formed by a light-transmitting base material and a polarization separation layer laminated thereonto, this polarization separation layer being a liquid crystal layer made of a cholesteric liquid crystal. The thickness of the liquid crystal layer is smaller than the thickness that would be required to achieve a maximum reflectivity, so that part of one of the right and left circularly polarized light components is reflected with a reflectivity smaller than the maximum reflectivity.

13 Claims, 5 Drawing Sheets

REFLECTIVE CHOLESTERIC FILTER

This is a Continuation-in-Part of application Ser. No. 09/549,615 filed Apr. 14, 2000 now abandoned. The entire disclosure of the prior application is hereby incorporated by reference herein in its entirety.

BACKGROUND OF THE INVENTION

1. Field of the Invention

The present invention relates to an optical element that extracts either circularly polarized light of a prescribed rotation direction or linearly polarized light of a prescribed polarization direction, and more particularly it relates to a polarization extraction optical element that reflects part of one of right and left circularly polarized light or one of two linearly polarized lights, the oscillation planes of which are mutually perpendicular, and passes the remaining light.

2. Description of the Related Art

A polarizing beam splitter or polarizing filter is known as an optical element that reflects either right or left circularly polarized light and passes the other light.

One type of polarizing filter is disclosed, for example, in Japanese Unexamined Patent Application publications S60-191203, S62-136602, and Japanese Unexamined Patent Application publication H2-186301.

All of the above make use of a cholesteric liquid crystal to reflect either right or left circularly polarized light of a specific wavelength and pass the other light.

As a method for broadening the wavelength band of the passed light, there is, for example, the disclosure in Japanese Unexamined Patent Application publication H6-281814, in which the helical pitch of a cholesteric liquid crystal is changed, or as disclosed in Japanese Unexamined Patent Application publication H9-304770, in which several layers of cholesteric liquid crystals having different helical pitches are overlapped.

An example of a linear polarization extraction optical element would be a polarizing beam splitter or a polarizing filter. These have a planar multilayer structure in which a large number of layers of birefringent materials are laminated, arranged so that the difference in refractive indices of layers that are mutually adjacent in the thickness direction with respect to one of two linearly polarized light components that have oscillation directions that are mutually perpendicular within a plane is different than the difference in refractive indices of layers mutually adjacent in the thickness direction with respect to the other linearly polarized light component.

An optical element that uses a cholesteric liquid as any of those described above reflects either right or left circularly polarized light in a specific wavelength range and passes the other circularly polarized light component in this wavelength range, and also passes all of the left and right circularly polarized light in other wavelength regions, and light incident from the opposite side is affected in the same manner, either left or right circularly polarized light being reflected and therefore striking the optical element, the result being that, although it is possible extract as reflected light either right or left circularly polarized light in a specific wavelength region, it is not possible to perform extraction from the transmitted light.

A reflecting/transmitting optical element using cholesteric liquid crystal has a fixed reflection/transmission ratio of 50/50, and is therefore accompanied by the problem of preventing free changing of this ratio as required.

Additionally, because either right or left circularly polarized light is passed and the other light is reflected, meaning that the light is separated in accordance with its polarization direction, the extracted light is unnatural light made up of a single polarization component.

For this reason, for example, in the case of using this optical element as a polarizing filter for photographic equipment such as a camera or the like, depending upon the object being photographed, there is the problem of unexpected fringe patterns occurring.

Additionally, when a linearly polarization extraction optical element is used as a polarizing beam splitter or the like, the reflection/transmission ratio is fixed at 50/50, and cannot be changed freely as required.

On one side of the element, it possible to extract either reflected light or transmitted light of the incident light made up by a component of one linear polarization only, it is not possible to extract from both the reflected light and the transmitted light two linearly polarized components having oscillation planes that are mutually perpendicular.

Because one linearly polarized component of two components having mutually perpendicular oscillation planes is transmitted and the other is reflected, that is, because the light is separated in accordance with the polarization direction, the resulting light is unnatural, being made up of a light component of only one polarization direction.

For this reason, when such a beam splitter is used as a polarizing filter in photographic equipment such as a camera, depending upon the object being photographed, there is the problem of unexpected fringe patterns occurring.

The present invention was made in consideration of the above-described drawbacks of past technology, and has as an object to provide a polarized light extraction optical element that can extract, from both reflected light and transmitted light, either one of right- and left-rotational circularly polarized light of a specific wavelength region, or one of two linearly polarized light components of a specific wavelength region, the oscillation planes of which are mutually perpendicular.

It is another object of the present invention to provide a polarized light extraction optical element that enables the ratio between a transmitted light component and a reflected light component to be arbitrarily adjusted.

It is yet another object of the present invention to provide a polarized light extraction optical element that, by mixing different polarized light components, can obtain light that approaches to being natural light.

SUMMARY OF THE INVENTION

The present invention has a polarization separation layer laminated onto a light-transmitting substrate, this polarization separation layer has one of two functions, one to separate at least part of non-polarized incident light into two linearly polarized lights, the polarization directions of which are mutually perpendicular, one being reflected, and another being transmitted, the other to separate at least part of the non-polarized incident light into two circularly polarized lights, the rotation directions of which are mutually opposite, one being reflected and the other being transmitted, the thickness of the polarization separation layer being within the range of 10% to 90% of the thickness required to reflect the one polarized light component with the maximum reflectivity.

In the above-noted polarized light extraction optical element, there can be an auxiliary polarization separation layer on the above-noted polarization separation layer, this auxiliary polarization separation layer having a function of transmitting a polarized light component that remained from the reflection by the polarization separation layer and was transmitted therethrough, and reflecting the other polarized light component that remained from the reflection by the polarization separation layer and was transmitted therethrough, the thickness of the auxiliary polarization separation layer being in the range of 10% to 90% of the thickness required to reflect the other polarization component with the maximum reflectivity.

In the above-noted polarized light extraction optical element, the polarization separation layer can be a liquid crystal having cholesteric characteristics, the helical axis of liquid crystal molecules thereof being formed so as to traverse the liquid-crystal layer in the thickness direction, and the thickness of the liquid-crystal layer being thinner than the thickness required to reflect the one of the incident right or left circularly polarized light components with maximum reflectivity, so that this circularly polarized light component is reflected thereby with a reflectivity that is less than the maximum reflectivity, the other left or right circularly polarized light component being transmitted therethrough.

Additionally, the number of molecular helix pitches in the part in which the selective reflection wavelength of the liquid-crystal layer in the polarization separation layer is less than 20, and preferably between 1 and 10 pitches.

Additionally, the thickness of the part in which the selective reflection wavelength of the liquid crystal is in the visible light region in the polarization separation layer is less than 30 µm, and preferably in the range 5 to 20 µm.

Additionally, the pitch of the molecular helix of the liquid-crystal layer in the polarization separation layer can be changed in the thickness direction of the liquid crystal layer, and the difference between the maximum pitch and minimum pitch thereof can be made at least 100 nm.

The pitch of the molecule helix in the liquid crystal layer is made such that the circularly polarized light reflection wavelength bandwidth is 300 nm or greater, and preferably in the range 400 to 800 nm.

Additionally, the liquid crystal layer has a molecule helix pitch such that it minimally reflects circularly polarized light of the colors red, green, and blue.

There can be an auxiliary polarization separation layer laminated onto said polarization separation layer, wherein said auxiliary polarization separation layer is a liquid crystal having cholesteric characteristics, a helical axis of liquid crystal molecules thereof being formed so as to traverse said liquid-crystal layer in a thickness direction, and a thickness of said liquid-crystal layer being smaller than a thickness required to reflect said other circularly polarized light components with maximum reflectivity, so that said other circularly polarized light component is reflected thereby with a reflectivity that is less than said maximum reflectivity, said one circularly polarized light component being transmitted therethrough.

Additionally, the number of molecular helix pitches in a part in which a selective reflection wavelength of said liquid-crystal layer in said auxiliary polarization separation layer is less than 20, and preferably between 1 and 10 pitches.

Additionally, the thickness of a part in which a selective reflection wavelength of a liquid crystal is in the visible light region in said auxiliary polarization separation layer is less than 30 µm, and preferably in a range 5 to 20 µm.

Additionally, the pitch of a molecular helix of said liquid-crystal layer in said auxiliary polarization separation layer is changed in a thickness direction of said liquid crystal layer, and a difference between a maximum pitch and a minimum pitch thereof is made at least 100 nm.

Additionally, the pitch of a molecule helix in said liquid crystal layer is made such that the circularly polarized light reflection wavelength bandwidth is 300 nm or greater, and preferably in the range 400 to 800 nm.

Additionally, the liquid crystal layer has a molecule helix pitch such that it minimally reflects circularly polarized light of the colors red, green, and blue.

In the present invention, with respect to light that is incident from one side of a laminate that exhibits cholesteric behavior right or left circularly polarized light having a broad wavelength range is extracted as reflected light, and it is possible to extract, as transmitted light incident from the opposite side, circularly polarized light having the same rotational direction and in the same wavelength region as the reflected light on the same side as the reflected light.

In the above-noted polarized light extraction optical element, the polarization separation layer can be formed by a plurality of liquid crystal layers exhibiting cholesteric behavior, each of these liquid crystal layers being laminated so that they have the same liquid crystal molecule rotational direction and so that the molecule helix axis traverses the liquid crystal layer in the thickness direction. The liquid crystal layers have mutually different distances per pitch in their molecular helices, and the thicknesses of the liquid crystal layers are thinner than the thickness required to reflect either the right or left circularly polarized light component at the wavelength of the incident light with maximum reflectivity, so that the right or left circularly polarized light is reflected with a reflectivity less than the maximum reflectivity, the other circularly polarized component (left- or right-rotational, respectively) being transmitted.

In the present invention, it is possible to use a laminate made of a plurality of liquid crystal layers exhibiting cholesteric characteristics, the distance per pitch of the molecular helices in each liquid crystal layer being mutually different, enabling extraction of right or left circularly polarized light having abroad wavelength region as reflected light with respect to light incident to thereto from one side, and extraction of circularly polarized light having the same rotational direction and in the same wavelength region as the reflected light on the same side as the reflected light.

In the above-noted polarized light extraction optical element, the number of molecular helix pitches in said each liquid-crystal layers is less than 20, and preferably between 1 and 10 pitches.

In the above-noted polarized light extraction optical element, the thickness of a part in which a selective reflection wavelength of a liquid crystal is in the visible light region in said each polarization separation layer is less than 5 µm, and preferably in a range 1 to 4 µm.

Additionally, the liquid crystal layer has three kind of helical pitch molecular such that it minimally reflects circularly polarized light of the colors red, green, and blue, and each kind of the helical pitch molecule consists of at least one liquid crystal layer.

There can be an auxiliary polarization separation layer laminated onto said polarization separation layer, wherein said auxiliary polarization separation layer is a liquid crystal having cholesteric characteristics, a helical axis of liquid crystal molecules thereof being formed so as to traverse said liquid-crystal layer in a thickness direction, and a thickness of said liquid-crystal layer being smaller than a thickness required to reflect said other circularly polarized light components with maximum reflectivity, so that said other circularly polarized light component is reflected thereby with a reflectivity that is less than said maximum reflectivity, said one circularly polarized light component being transmitted therethrough.

Additionally, the number of molecular helix pitches in a part in which a selective reflection wavelength of said liquid-crystal layer in said auxiliary polarization separation layer is less than 20, and preferably between 1 and 10 pitches.

Additionally, the thickness of a part in which a selective reflection wavelength of a liquid crystal is in the visible light region in said auxiliary polarization separation layer is less than 30 $\mu$m, and preferably in a range 5 to 20 $\mu$m.

Additionally, the pitch of a molecular helix of said liquid-crystal layer in said auxiliary polarization separation layer is changed in a thickness direction of said liquid crystal layer, and a difference between a maximum pitch and a minimum pitch thereof is made at least 100 nm.

Additionally, the pitch of a molecule helix in said liquid crystal layer is made such that the circularly polarized light reflection wavelength bandwidth is 300 nm or greater, and preferably in the range 400 to 800 nm.

Additionally, the liquid crystal layer has a molecule helix pitch such that it minimally reflects circularly polarized light of the colors red, green, and blue.

In the above-noted polarized light extraction optical element, the configuration can be one in which the polarization separation layer is a birefringent layer is provided on a light-transmitting material, this birefringent layer being of multilayer planar construction made of at least three laminated layers of birefringent material such that the difference in refractive indices of layers that are mutually adjacent in the thickness direction with respect to one of two linearly polarized light components that have oscillation directions that are mutually perpendicular within the plane of each layer is different than the difference in refractive indices of layers mutually adjacent thereto in the thickness direction with respect to the other linearly polarized light component. Furthermore, the number of laminated layers of birefringent material can be made smaller than the number required to reflect one of the linearly polarized light components with maximum reflectivity, so that the one linearly polarized light component is reflected with reflectivity smaller than the maximum reflectivity, the other linearly polarized light component being transmitted.

Additionally, in the above-noted polarized light extraction optical element, it is possible further provide an auxiliary polarization separation layer on the above-noted polarization separation layer, this auxiliary polarization separation layer being of planar laminated construction of three or more layers of birefringent material, and being such that the difference in refractive indices of layers that are mutually adjacent in the thickness direction with respect to one of two linearly polarized light components that have oscillation directions that are mutually perpendicular within the plane of each layer is different than the difference in refractive indices of layers mutually adjacent thereto in the thickness direction with respect to the other linearly polarized light component. Furthermore the number of layers of birefringent material in the auxiliary polarization separation layer can be made smaller than the number required to reflect light other linear polarization direction with the maximum reflectivity, so that the other linearly polarized light component is reflected with a reflectivity that is smaller than the maximum reflectivity, with light of the opposing linear polarization direction being transmitted.

In the above-noted polarized light extraction optical element, the number of birefringent material layers in at least one of the polarization separation layer and the auxiliary polarization separation layer can be made 30 to 150.

In the present invention, a prescribed linearly polarized light component is extracted as reflected light with respect to light incident from one side of the polarization separation layer, and light of the same linear polarization direction as the reflected light is extracted as transmitted light in the opposite direction.

Using a polarized light extraction optical element according to the present invention it is possible, for example, when using a cholesteric color liquid crystal or birefringent layer to inspect the validity of such items as certificates and credit cards that have been patterned with information that cannot be seen with visible light, to extract circularly polarized or linearly polarized light from natural light and shine the extracted light onto the credit card or the like, causing light from a illumination lamp to be reflected by a polarized light extraction optical element of the present invention, the extracted circularly or linearly polarized light being then shone onto the item to be validated.

DESCRIPTION OF PREFERRED
EMBODIMENTS OF THE INVENTION

Preferred embodiments of the present invention are described in detail below, with references being made to relevant accompanying drawings.

Figure 1:
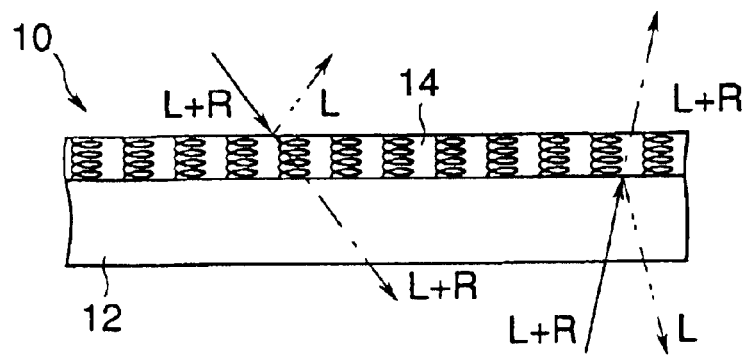
FIG. 1 is a simplified cross-section view showing a polarized light extraction optical element according to a first embodiment of the present invention.

As shown in FIG. 1, a polarized light extraction optical element 10 according to an embodiment of the present invention is formed by a light-transmitting base material 12 and a liquid crystal layer 14 laminated onto the light-transmitting base material 12 as a polarization separation layer.

The liquid crystal layer 14 is made by aligning a liquid crystal exhibiting cholesteric characteristics so that molecular helix thereof transverses the liquid crystal in the thickness direction, the thickness thereof being made thinner than the thickness required to achieve the maximum reflectivity (usually 95 to 99%) with respect to either right or left circularly polarized incident light, thereby causing reflection of that direction of circularly polarized light with a reflectivity that is smaller than the maximum reflectivity, and transmission of the other direction of circularly polarized light (left- or right-rotational, respectively).

The above-noted cholesteric liquid crystal, based on based on physical molecule alignment, usually has selective circular polarization characteristics that separate light of one circular polarization from light of circular polarization of the oppositely rotated direction, with light incident to the planarly oriented helix axis being split into two circularly polarized components, left- and right-rotational, one of which is transmitted, and the other of which is reflected.

This phenomenon is known as circular dichroism, and if the rotation direction of the circularly polarized light is selected appropriately with respect to the incident light, there is selective diffuse reflection of circularly polarized light having the same rotation direction as the helical axis direction in the cholesteric liquid crystal.

The maximum circularly polarized light diffusion in the above-noted case occurs at a wavelength of λ0, given by Equation (1)

$$\lambda 0 = n_{av} \cdot p \qquad (1)$$

In the above, p is the helical pitch, and nav is the average refractive index within the plane perpendicular to the helical axis.

Figure 2:
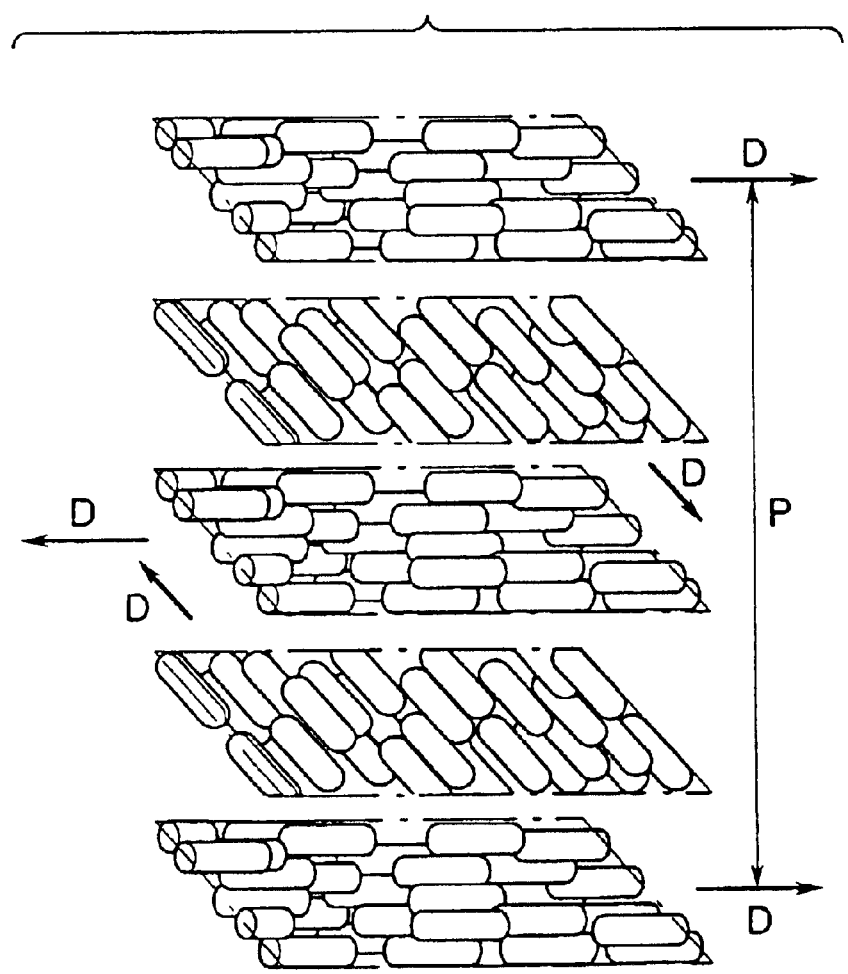
FIG. 2 is an enlarged perspective view showing the relationship between the pitch and the directors cholesteric liquid crystal molecules.

The term helical pitch (p) as used above, as shown in FIG. 2, refers to the distance p in the thickness direction required for one rotation of the director D of the liquid crystal molecules in the liquid crystal layer.

The wavelength bandwidth Δλ under these conditions is given by Equation (2).

$$\Delta \lambda = \Delta n \cdot p \qquad (2)$$

In the above, Δn is the value of birefringence.

Methods of broadening the wavelength bandwidth Δλ include that of changing the helical pitch (disclosed, for example, in Japanese Unexamined Patent Application publication H6-281814) and that of overlapping several layers of cholesteric liquid crystal for which p differs (disclosed, for example, in Japanese Unexamined Patent Application publication H9-304770).

As a cholesteric liquid crystal material, it is desirable to use a chiral nematic liquid crystal with a Shiff's base, an azo compound, an ester, or a biphenyl nematic liquid crystal compound, with an optically activated 2-methyl butyl group, a 2-methyl butoxy group, a 4-methyl hexyl group joined to an end group thereof, or a chiral reactive liquid crystal compound such as disclosed in the Japanese Unexamined Patent Application publication H7-258638, a ring organopolysiloxane compound having a cholesteric phase as disclosed in the Japanese Unexamined Patent Application publication S57-165480, or a polymerizable monomer and chiral compound such as disclosed in the Japanese Unexamined Patent Application publication S10-508882.

Whereas a general high-polymer liquid crystal is a high polymer in which a mesogen group is introduced in the main chain, the side chain, or the main and side chain positions, a high-polymer cholesteric liquid crystal is obtained by introducing a cholesteryl group, for example, into the side chain.

In the case of a high-polymer liquid crystal, it is desirable that, for example, a liquid crystal high polymer such as disclosed in the Japanese Unexamined Patent Application publication H9-133810, or a liquid crystal high polymer such as disclosed in the Japanese Unexamined Patent Application publication H11-293252 or the like be used as a cholesteric liquid crystal material.

The light-transmitting base material 12 is made of a single or a copolymer of an acrylic ester such as polymethyl metacrylate or metacrylate ester, a polyester such as polyethylene teraphthalate, a transparent resin such as polycarbonate or polyethylene, transparent glass, or a transparent ceramic or the like, formed into a planar sheet or plate.

The polarization separation action of the cholesteric liquid crystal causes passes of either the right or the left circularly polarized light, and reflection of the circularly polarized light of the other rotational direction. When reflection occurs, the right or left circularly polarized light is reflected without change, as right or left circularly polarized light.

In the case of a cholesteric liquid crystal, in order to reflect either the right or the left circularly polarized light with the maximum reflectivity and pass the circularly polarized light of the other direction, it is necessary to make the number of pitches of the molecular helix in the part for which the selective reflection wavelength is the same be at least 8. In contrast to this, in the present invention the number of pitches in the part for which the selective reflection wavelength is the same is made 6.4, this being less than the required number of pitches.

Therefore, in the wavelength range Δλ, the amount of reflection of either right or left circularly polarized light can be made 80%, with the amount of transmitted light being 20%. With regard to the polarized light of the other circular polarization, compared to the case in which there are 8 pitches in a cholesteric liquid crystal, the transmissivity is improved to nearly 100%. In FIG. 1 and FIG. 2 (as will be described below), the reference symbols R and L refer to right and left circularly polarized light, respectively.

Therefore, as shown in FIG. 1, when the liquid crystal layer 14 reflects 80% of the left circularly polarized light of the incident natural light from above, with respect to light incident from the opposite side (i.e., the bottom), there is 20% transmission of left circularly polarized light to the same side (upward) as the 80% reflected left circularly polarized light. That is, it is possible to obtain light of the same left circular polarization from both reflected light and transmitted light.

If the number of pitches of in the liquid crystal layer 14 is made, for example, 5.6 pitches, it is possible to make the reflectivity for either right or left circularly polarized light in the liquid crystal layer be 70%, with the transmitted proportion of light being 30%. That is, depending upon the thickness of the liquid crystal layer 14, it is possible to obtain an arbitrary reflectivity and transmissivity with respect to the maximum reflectivity.

In the case of a cholesteric liquid crystal, in order to reflect either right or left circularly polarized light with the maximum reflectivity in the visible light region, with the other direction of circularly polarized light being transmitted, it is generally necessary to make the thickness of the liquid crystal layer in the part in which the selectively reflected wavelength is in the visible light region 30 μm.

In contrast to this, in the present invention the thickness of the liquid crystal layer made of the above-noted cholesteric liquid crystal is made, for example, 10 μm, which is thinner than the above-noted 30 μm.

Therefore, in contrast to the 30-μm thickness, it is possible to make the reflectivity for right or left circularly polarized light 70%, with the transmissivity being 30%. With regard to the circularly polarized light of the other direction, compared to the case in which the thickness of the cholesteric liquid crystal is 30 μm, the transmissivity is improved to nearly 100%. In FIG. 1, and FIG. 2 (as will be described below), the reference symbols R and L refer to right and left circularly polarized light, respectively.

Therefore, as shown in FIG. 1, when the liquid crystal layer 14 reflects 70% of the left circularly polarized light of the incident natural light from above, with respect to light incident from the opposite side (i.e., the bottom), there is 30% transmission of left circularly polarized light to the same side (upward) as the 70% reflected left circularly polarized light. That is, it is possible to obtain light of the same left circular polarization from both reflected light and transmitted light.

For example, if the thickness of the liquid crystal layer 14 is made 15 μm, it is possible to make the reflectivity for either right or left circularly polarized light in the liquid crystal layer be 80%, with the transmitted proportion of light being 20%. That is, depending upon the thickness of the liquid crystal layer 14, it is possible to obtain an arbitrary reflectivity and transmissivity with respect to the maximum reflectivity.

Figure 3:
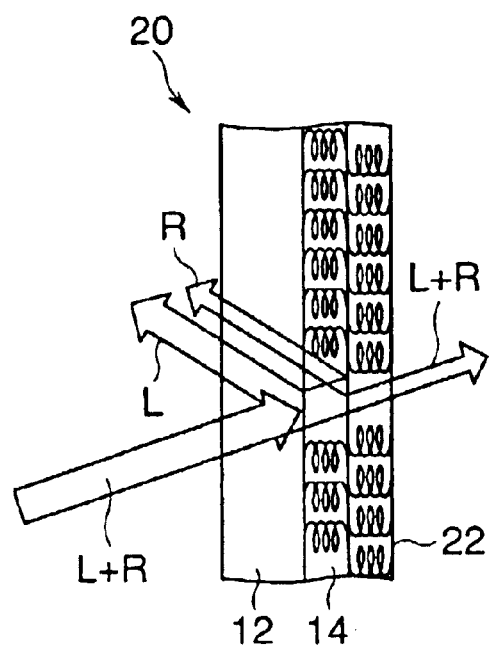
FIG. 3 is a simplified cross-section view showing a polarized light extraction optical element according a second embodiment of the present invention.

Next, a polarized light extraction optical element 20 according to the second embodiment of the present invention is described below, with reference made to FIG. 3.

The polarized light extraction optical element 20 uses a liquid crystal layer 14 as a polarization separation layer, over which a second liquid crystal layer 22 is laminated as an auxiliary polarization separation layer.

The second liquid crystal layer 22, similar to the liquid crystal layer 14, is made of a cholesteric liquid crystal, the alignment and thickness thereof, also similar to the liquid crystal layer 14, are such that a circularly polarized light of one rotational direction is reflected with a reflectivity that is less than the maximum reflectivity.

In contrast to the liquid crystal layer 14, however, the direction of the helical axis of the molecules of this auxiliary polarization separation layer is such that a part of the circularly polarized light of either right or left polarization that is 100% transmitted by the liquid crystal layer 14 is reflected, and the remaining light is transmitted, so that part of the light is reflected by at the liquid crystal layer 14 and one circularly polarized component of the remaining light is transmitted.

In the reflecting/transmitting optical element 20, by establishing the thicknesses of the liquid crystal layer 14 and the liquid crystal layer 22 appropriately, it is possible to arbitrarily adjust the proportion of right or left circularly polarized light that is transmitted by the second liquid crystal layer 22 so that, for example, these are equal.

Because the reflected component from the second liquid crystal layer 22 passes therethrough without being reflected by the liquid crystal layer 14, there is interference that is set up between the reflected component from the second liquid crystal layer 22 and the light reflected by the liquid crystal layer 14, so that, similar to the case of the second liquid crystal layer 22, it is possible to arbitrarily adjust the proportion of right- and left-rotational circularly polarized light.

Therefore, both the light that passes through the polarized light extraction optical element 20 and the light reflected thereby can be made to approach the condition of natural light.

Next, a method of forming the above-noted liquid crystal layer 14 is described below, with reference being made to FIG. 4.

Figure 4:
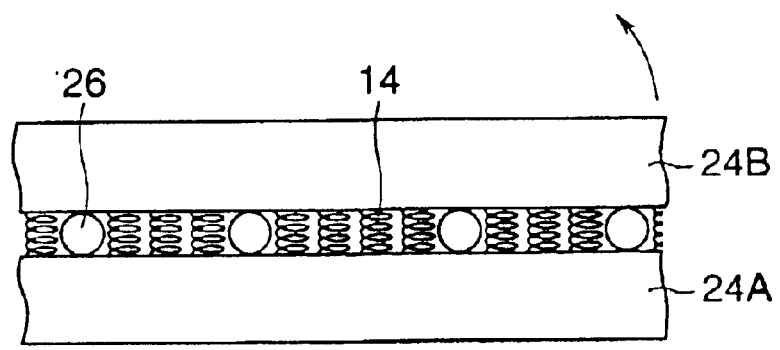
FIG. 4 is a simplified cross-section view illustrating the manufacturing process for a polarized light extraction optical element according to the present invention.

In the method illustrated in FIG. 4, when a cholesteric liquid crystal or a chiral nematic liquid crystal is injected between a pair of substrates 24A and 24B, beads 26 having a diameter equal to the desired thickness of the liquid crystal are dispersed as spacers, thereby establishing the thickness of the gap between the substrates 24A and 24B.

In this process, because there will be a bright spot occurring at the boundary between the beads and the cholesteric liquid crystal layer if there is a difference between the refractive indices of the beads and the cholesteric liquid crystal layer, the difference between the indices of refraction of the beads 26 and the cholesteric liquid crystal layer should be made small.

At least one liquid crystal side of the above-noted substrates 24A and 24B has formed on it an alignment film (not shown in the drawing), whereby the molecular helix axis in the liquid crystal injected between the substrates is aligned so as to traverse the liquid crystal in the thickness direction thereof.

A method of achieving alignment of the liquid crystal molecules is to use extended PET (polyethylene terephthalate) in place of the alignment film.

After curing the liquid crystal between the substrates 24A and 24B by, for example, shining UV light thereonto, one substrate is removed, either leaving the alignment film, or removed with the alignment film. If necessary, the exposed liquid crystal layer 14 is covered by a protective film (not shown in the drawing). It is alternately possible to use the light-transmitting base material 12 in place of the substrate 24A.

It is also possible for the second liquid crystal layer 22, to use side of the cured liquid crystal layer 14 as a substrate, or to use this as a substrate on the opposite side of the light-transmitting base material 12 from the side on which is formed the liquid crystal layer 14.

Figure 5:
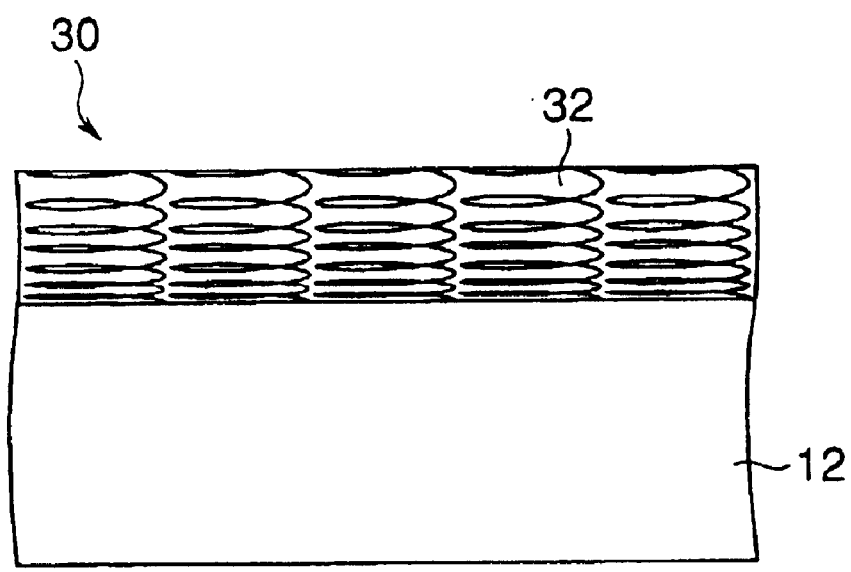
FIG. 5 is a simplified cross-section view showing a polarized light extraction optical element according to a third embodiment of the present invention.

Next, a polarized light extraction optical element 30 according to the third embodiment of the present invention is described below, with reference being made to FIG. 5.

The polarized light extraction optical element 30, similar to the case of the polarized light extraction optical element 10 of FIG. 1, uses a liquid crystal layer 32 having cholesteric characteristics as a polarization separation layer, this liquid crystal layer 32, in contrast to the above-noted liquid crystal layer, having a helical pitch in the molecules of the cholesteric liquid crystal that is changed in the thickness direction thereof, so that it is possible to obtain reflected and transmitted light over a broad wavelength region, for example over the entire visible light region.

The structure of a cholesteric liquid crystal in which the helical pitch is changed in this manner can be formed by a method that is disclosed, for example, in the Japanese Unexamined Patent Application publication H6-281814.

The liquid crystal layer 32 in the polarized light extraction optical element 30 as well has a thickness that is smaller than the thickness for maximum reflectivity, as is the case with the above-described liquid crystal layer 14 and second liquid crystal layer 22.

Therefore, similar to the case o the polarized light extraction optical elements 10 and 20, it is possible with the polarized light extraction optical element 30 to arbitrarily establish the reflectivity and transmissivity.

In this embodiment, the pitch of the molecular helix in the liquid crystal layer 32 is changed in the thickness direction of the liquid crystal layer, and the difference between the maximum pitch and the minimum patch is made at least 100-nm.

Specifically, the pitch of the molecular helix in the liquid crystal layer 32 is made so that the circularly polarized light reflection wavelength bandwidth is 300 nm or greater, and preferably so that it is 400 to 800 n.

If the above is done, it is possible to obtain reflected light over the entire visible light region.

In this case, if the molecular helical pitch is made such that the at least red, green, and blue circularly polarized light are reflected, these three primary colors can be used to obtain circularly polarized light over the entire visible light region.

Any of the above-described polarized light extraction optical elements 10, 20, and 30 can be used as either a beam splitter or a polarizing filter.

By virtue of the above-described constitution, it is possible to extract with respect to light incident to a laminate having cholesteric characteristics from one direction a right- or left-rotational circularly polarized light over a broad wavelength region and to transmit light incident from the opposite direction, this being extracted on the same side as and with the same rotational direction as the reflected light, and over the same broad wavelength region. In addition to being able to arbitrarily set the proportions of left that are reflected and transmitted, it is possible to mix light of differing polarization components in the transmitted light, thereby enabling achievement of light that is near to natural light.

The fourth embodiment of the present invention is described below, with reference being made to FIG. 6.

Figure 6:
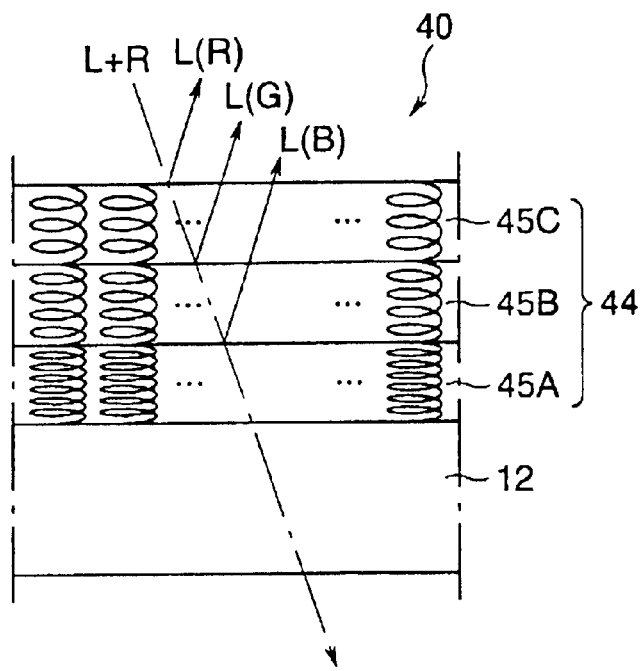
FIG. 6 is a simplified cross-section view showing a polarized light extraction optical element according to a fourth embodiment of the present invention.

As shown in FIG. 6, a polarized light extraction optical element 40 according to the present invention, is formed by a light-transmitting base material 12 and a laminate 44 formed as a polarization separation layer on the light-transmitting base material 12.

The laminate 44 is formed by a plurality of liquid crystal layers 45A, 45B, 45C, and so on, which have cholesteric characteristics, the rotational direction of the molecules in each liquid crystal layer being the same, and the lamination being done so that the molecular helix axes thereof traverse the liquid crystal in the thickness direction.

In the liquid crystal layers 45A, 45B, 45C, and so on, the distances per pitch of the molecular helix (i.e., the helical pitches) are mutually different, and the thicknesses of the liquid crystal layers 45A, 45B, 45C, and so on are smaller than the thickness required for reflection of either right or left circularly polarized light at the wavelength of light to strike the layers at the maximum reflectivity, so that this one circularly polarized light component (right or left) is reflected therefrom with a reflectivity that is less than the maximum reflectivity, the other circularly polarized light of the right and left circularly polarized light being transmitted therethrough.

In the case of a cholesteric liquid crystal, in order to reflect one of the right and left circularly polarized light components with a maximum reflectivity (usually 95 to 99%), and transmit the other of the right and left circularly polarized light components, it is generally necessary that the there be at least 8 pitches.

In contrast to this, however, in the present invention, as described above, the number of pitches in the liquid crystal layers 45A, 45B, 45C, and soon is made 6.4, this being less than the required number of pitches.

Therefore, in the wavelength range Δλ, the amount of reflection of either right or left circularly polarized light can be made 80%, with the amount of transmitted light being 20%. With regard to the polarized light of the other circular polarization, compared to the case in which there are 8 pitches in a cholesteric liquid crystal, the transmissivity is improved to nearly 100%.

If the number of pitches of in the liquid crystal layers 45A, 45B, 45C, and so on is made, for example, 5.6 pitches, it is possible to make the reflectivity for either right or left circularly polarized light in the liquid crystal layers be 70%, with the transmitted proportion of light being 30%. That is, depending upon the thickness of the liquid crystal layers, it is possible to obtain an arbitrary reflectivity and transmissivity with respect to the maximum reflectivity.

In the case of the above-noted cholesteric liquid crystal, in order to reflect one of the right and left circularly polarized light components with a maximum reflectivity (usually 95 to 99%), and transmit the other of the right and left circularly polarized light components, it is generally necessary with respect to a wavelength of 380 nm, that the thickness thereof be at least 1.6 $\mu$m, and with respect to a wavelength of 780 nm, that the thickness thereof be 3.3 $\mu$m.

In contrast to this, however, in the present invention, the thicknesses of the liquid crystal layers 45A, 45B, 45C, and so on made of cholesteric liquid crystal are, for example, in the range 1.2 $\mu$m (380 nm light) to 2.6 $\mu$m (780 nm light) for the visible light region, the thicknesses of each layer being varied linearly with respect to the selective reflection wavelength of the cholesteric liquid crystal layer, and all of them being thinner than the thickness required to achieve maximum reflectivity.

Therefore, for example, with the thicknesses of the liquid crystal layers 45A, 45B, 45C, and so on in the range from 1.1 $\mu$m (380 nm light) to 2.3 $\mu$m (780 nm light), if the thicknesses of each layer is varied linearly with respect to the selective reflection wavelength of each cholesteric liquid crystal layer, it is possible to make the reflectivity of each of the liquid crystal layers 45A, 45B, 45C, and so on be 70% with respect to one of the right and left circularly polarized light, the 30% of circularly polarized light of the other rotational direction being transmitted therethrough. That is, it is possible obtain arbitrary reflectivities and transmissivities with respect to the maximum reflectivity, according to the thicknesses of each liquid crystal layer.

Therefore, if the helical pitches of the liquid crystal molecules in the liquid crystal layers 45A, 45B, 45C, and so on are, for example, made so that light of wavelengths corresponding to red (R), green (G), and blue (B) are reflected, this condition is suitable for reading, as noted above, color information that has been written onto a credit card or the like using circularly polarized light.

Additionally, because in the polarized light extraction optical element 40 the liquid crystal layers 45A, 45B, 45C, and so on are thinner than would be required to reflect one circularly polarized light of right and left circularly polarized light, it is possible to obtain, from transmitted light incident from the opposite side as light that strikes for the purpose of forming reflected light, transmitted light with the same kind of circular polarization as the reflected light. Therefore, the polarized light extraction optical element 40 also enables the reading of information that is written by circularly polarized light such as noted above.

When reading the above-noted information, it is alternately possible to perform the reading via the polarized light extraction optical element.

Figure 7:
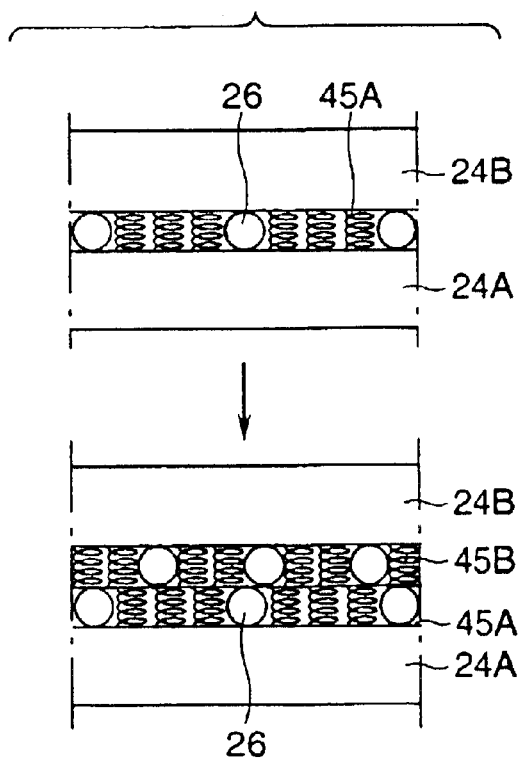
FIG. 7 is a simplified cross-section view showing the manufacturing process for a polarized light extraction optical element according to the present invention.

Next, a method of forming the above-noted liquid crystal layers 45A, 45B, 45C, and is described below, with reference being made to FIG. 7.

In the method illustrated in FIG. 4, when a cholesteric liquid crystal or a chiral nematic liquid crystal is injected between a pair of substrates 24A and 24B, beads 26 having a diameter equal to the desired thickness of the liquid crystal are dispersed as spacers, thereby establishing the thickness of the gap between the substrates 24A and 24B.

In this process, because there will be a bright spot occurring at the boundary between the beads and the cholesteric liquid crystal layer if there is a difference between the refractive indices of the beads and the cholesteric liquid crystal layer, the difference between the indices of refraction of the beads 26 and the cholesteric liquid crystal layer should be made small.

At least one liquid crystal side of the above-noted substrates 24A and 24B has formed on it an alignment film (not shown in the drawing), whereby the molecular helix axis in the liquid crystal injected between the substrates is aligned so as to traverse the liquid crystal in the thickness direction thereof.

A method of achieving alignment of the liquid crystal molecules is to use extended PET (polyethylene terephthalate) in place of the alignment film.

After curing the liquid crystal between the substrates 24A and 24B by, for example, shining UV light thereonto, one substrate is removed, either leaving the alignment film, or removed with the alignment film, thereby completing the liquid crystal layer 45A, which the first liquid crystal layer.

The second liquid crystal layer, 45B, is formed by the same procedure as described above, using the cured liquid crystal layer 45A as one substrate, this process being successively repeated so as to laminate the liquid crystal layers 45A, 45B, 45C, and so on, thereby completing the laminate 44. If necessary, the exposed laminate 44 is covered by a protective film (not shown in the drawing).

Although in the foregoing description the liquid crystal layers 14, 22, 45A, 45B, 45C, and so on are made of cholesteric liquid crystals, the present invention does not impose this as a restriction, and can use any liquid crystal with cholesteric characteristics and having a helical molecular structure. Thus, it is alternately possible to use a chiral nematic liquid crystal, in which case handling is facilitated by first performing three-dimensional bridging (polymerizing).

By adopting the constitution described in detail above, the present invention has superior effectiveness in obtaining circularly polarized light of a prescribed rotational direction, by either reflected light or transmitted light.

The fifth embodiment of the present invention is described above, with reference made to FIG. 8.

A polarized light extraction optical element 50 in the fifth embodiment of the present invention is obtained by forming a birefringent layer 54 as a polarization separation layer on a light-transmitting base material 12, so as to transmit one of two linearly polarized light components that have mutually perpendicular oscillation directions and reflect the other linearly polarized light component.

The birefringent layer 54 has a planar multilayer structure in which at least three layers of birefringent materials are laminated, arranged so that the difference in refractive indices of layers that are mutually adjacent in the thickness direction with respect to one of two linearly polarized light components that have oscillation directions that are mutually perpendicular within a plane is different than the difference in refractive indices of layers mutually adjacent in the thickness direction with respect to the other linearly polarized light component.

A birefringent film such as noted above is disclosed, for example, in Japanese Unexamined Patent Application publication H3-75705, in which drawing or the like is used to obtain a substance such as a polycarbonate resin, a polyester resin, a polyvinyl alcohol resin, and an acetyl cellulose resin or other substance that exhibits intraplanar birefringence (refractive index anisotropy).

For example, if the refractive index with respect to a light beam which oscillates in the X-axis direction of adjacent birefringent layers (films) is nx, the refractive index difference $\Delta nx$ between layers adjacent in the X axis is given as $\Delta nx = |nx - nx|$, which is substantially zero.

In contrast to this, if the refractive indices with respect to a light beam oscillating in the Y-axis direction of the first and the third layers of a three-layer birefringent layer are both ny1 and the refractive index of the second layer in the same direction is ny2≠ny1, then the refractive index between layers adjacent in the Y-axis direction, $\Delta ny$, is substantially not zero.

The reflection of light oscillating in a direction (Y-axis direction) in which the refractive index difference is large is greater than the reflection of light oscillating in a direction in which the refractive index is small (X-axis direction), and the transmission of X-axis direction light is greater than the transmission of Y-axis direction light.

For this reason, as seen from light oscillating in the X-axis direction, even if the birefringent layer has a planar multilayer structure, because its refractive index is substantially uniform, there is only a slight reflection at the point of incidence to and the point of exit from the birefringent layer.

In contrast to the above, as seen from light oscillating in the Y-axis direction, because the refractive indices of different layers of the planar multilayer structure mutually differ, there is not only reflection at the point of incidence to and exit from the birefringent layer, but also at the surfaces (boundaries) between each of the layers, the number of reflections of light oscillating in the Y-axis direction increasing with an increase in the number of layers in the birefringent layer.

For example, while the birefringent layer 54 is laminated of approximately 200 layers in order to obtain the maximum reflectivity, in the case of the present invention, this number is reduced to, for example, approximately 20 to 170 layers.

Figure 8:
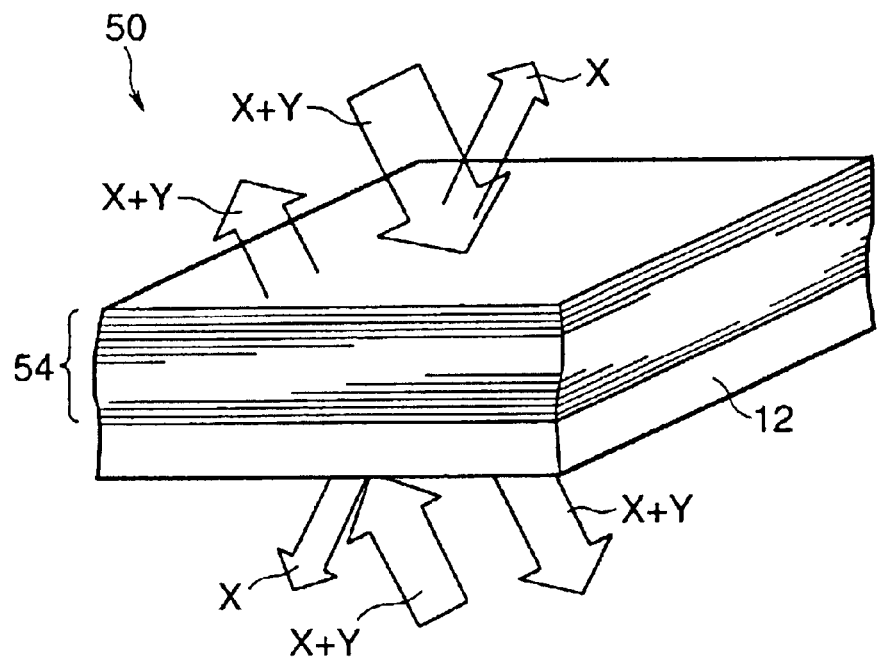
FIG. 8 is a simplified cross-section view showing a polarized light extraction optical element according to a fifth embodiment of the present invention.
Figure 9:
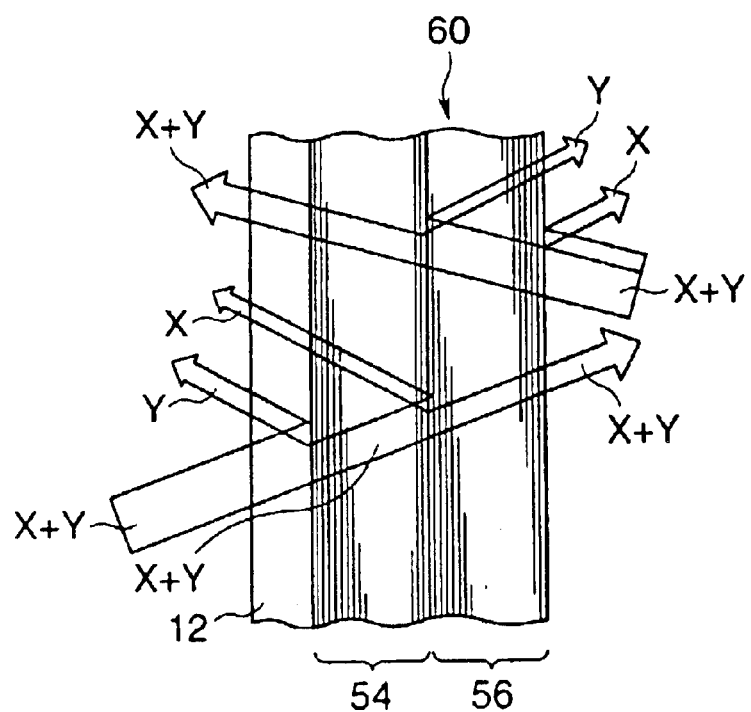
FIG. 9 is a simplified cross-section view showing a polarized light extraction optical element according to a sixth embodiment of the present invention.

If this is done, of the two linearly polarized components of light that strikes the polarized light extraction optical element having mutually perpendicular oscillation directions, the one direction indicated by the symbol X in FIG. 8 is reflected with a reflectivity lower than the maximum reflectivity as in the case of 200 layers, the remaining light being transmitted, in all cases with a transmissivity that is greater than the maximum transmissivity, this being indicated by the symbol Y.

Therefore, for example, it is possible to obtain at the top of the polarized light extraction optical element 50 linearly polarized light X as reflected light incident from the top in FIG. 8, and linearly polarized light Y as transmitted light from the bottom in FIG. 8. Of the transmitted light, there are two linearly polarized light components having mutually perpendicular oscillation directions.

By appropriately establishing the number of laminations of the birefringent layer 54, it is possible to adjust the reflectivity and transmissivity, enabling the achievement of an arbitrary amount of reflected light and amount of transmitted light.

A polarized light extraction optical element 60 according to the sixth embodiment of the present invention is described below, with reference being made to FIG. 6.

The polarized light extraction optical element 60 is formed by a birefringent layer 54, onto which is laminated a second birefringent layer 56 as an auxiliary polarization separation layer, this second birefringent layer 56, similar to the birefringent layer 54, having fewer laminations that the number of laminations for achieving the maximum reflectivity.

The linearly polarized light component reflected by the second birefringent layer 56 is the same as the linearly polarized light component transmitted through the birefringent layer 54.

Therefore, in the polarized light extraction optical element 60, by appropriately adjusting the birefringent layer 54 and the second birefringent layer 56, it is possible to arbitrarily adjust the proportions of two linearly polarized light components having mutually perpendicular oscillation directions in the transmitted light and the reflected light.

Both the above-described polarized light extraction optical elements 50 and 60 can be used as either a beam splitter or a polarizing filter.

By adopting the above-described constitution of the present invention, it is possible to extract one of two linearly polarized light component having mutually perpendicular oscillation directions from both the reflected light and the transmitted light at side of the optical element, and further possible not only to arbitrarily adjust the proportion of reflected light and transmitted light, but also to mix polarization components in the transmitted light.

What is claimed is:

1. A reflective cholesteric filter comprising:
   a substrate;
   a polarization separation layer laminated onto to said substrate; and
   an auxiliary polarization separation layer laminated onto said polarization separation layer, wherein said polarization separation layer has a function to separate at least part of non-polarized incident light into two circularly polarized lights, the rotational directions of which are mutually opposite, one being reflected and another being transmitted, further wherein said polarization separation layer is a liquid crystal having cholesteric characteristics, a helical axis of liquid crystal molecules thereof being formed so as to traverse said liquid-crystal layer in a thickness direction, a thickness of said liquid-crystal layer being smaller than a thickness required to reflect one of said incident right or left circularly polarized light components at a selective reflection wavelength with maximum reflectivity, the number of molecular helix pitches in a part in which the selective reflection wavelength of said liquid-crystal layer in said polarization separation layer is between 1 and 10 pitches, so that said circularly polarized light component is reflected thereby with a reflectivity that is less than said maximum reflectivity, said other left or right circularly polarized light component being transmitted therethrough, said auxiliary polarization separation layer is a liquid crystal having cholesteric characteristics, a helical axis of liquid crystal molecules thereof being formed so as to traverse said liquid-crystal layer in a thickness direction, and a thickness of said liquid-crystal layer being smaller than a thickness required to reflect said other circularly polarized light components at a selective reflection wavelength with maximum reflectivity, and the number of molecular helix pitches in a part in which the selective reflection wavelength of said liquid-crystal layer in said polarization separation layer is between 1 and 10 pitches, so that said other circularly polarized light component is reflected thereby with a reflectivity that is less than said maximum reflectivity, said one circularly polarized light component being transmitted therethrough.

2. The reflective cholesteric filter according to claim 1, wherein a thickness of a part in which a selective reflection wavelength of a liquid crystal is in the visible light region in said auxiliary polarization separation layer is in a range 5 to 20 $\mu$m.

3. The reflective cholesteric filter according to claim 1, wherein the pitch of a molecular helix of said liquid-crystal layer in said auxiliary polarization separation layer is changed in a thickness direction of said liquid crystal layer, and a difference between a maximum pitch and a minimum pitch thereof is made at least 100 nm.

4. The reflective cholesteric filter according to claim 3, wherein a pitch of a molecule helix is said liquid crystal layer is made such that the circularly polarized light reflection wavelength bandwidth is in the range of 400 to 800 nm.

5. The reflective cholesteric filter according to claim 3, wherein said liquid crystal layer has a molecule helix pitch such that it minimally reflects circularly polarized light of the colors red, green, and blue.

6. A reflective cholesteric filter comprising:
   a substrate; and
   a polarization separation layer laminated onto said substrate; wherein said polarization separation layer has a function to separate at least part of non-polarized incident light into two circularly polarized lights, the rotational directions of which are mutually opposite, one being reflected and another being transmitted and further wherein said polarization separation layer is formed by a plurality of liquid crystal layers exhibiting cholesteric behavior, each of said liquid crystal layers being laminated so that they have the same liquid crystal molecule rotational directions and so that a molecule helix axis traverses the liquid crystal layer in a thickness direction, said liquid crystal layers have mutually different distances per pitch in their molecular helices, and thicknesses smaller than a thickness required to reflect either a right or a left circularly polarized light component at a selective reflection wavelength with a maximum reflectivity, and the number of molecular helix pitches in said each liquid-crystal layers is between 1 and 10 pitches, so that said right or left circularly polarized light is reflected with a reflectivity less than said maximum reflectivity, the other circularly polarized component being transmitted therethrough.

7. The reflective cholesteric filter according to claim 6, wherein a thickness of a part in which a selective reflection wavelength of a liquid crystal is in the visible light region in said each polarization separation layer is in a range of 1 to 4 $\mu$m.

8. The reflective cholesteric filter according to claim 6, wherein said liquid crystal layer has three kinds of molecular helix pitches such that it minimally reflects circularly polarized light of the colors red, green, and blue, and each kind of the molecular helix pitch corresponds to at least one liquid crystal layer.

9. The reflective cholesteric filter according to claim 6, further comprising an auxiliary polarization separation layer laminated onto said polarization separation layer, wherein said auxiliary polarization separation layer is a liquid crystal having cholesteric characteristics, a helical axis of liquid crystal molecules thereof being formed so as to traverse said liquid-crystal layer in a thickness direction, and a thickness of said liquid-crystal layer being smaller than a thickness required to reflect said other circularly polarized light components at a selective reflection wavelength with maximum reflectivity, and the number of molecular helix pitches in a part in which the selective reflection wavelength of said liquid-crystal layer in said auxiliary polarization separation layer is between 1 and 10 pitches, so that said other circularly polarized light component is reflected thereby with a reflectivity that is less than said maximum reflectivity, said one circularly polarized light component being transmitted therethrough.

10. The reflective cholesteric filter according to claim 9, wherein a thickness of a part in which a selective reflection wavelength of a liquid crystal is in the visible light region in said auxiliary polarization separation layer is in a range 5 to 20 $\mu$m.

11. The reflective cholesteric filter according to claim 9, wherein the pitch of a molecular helix of said liquid-crystal layer in said auxiliary polarization separation layer is changed in a thickness direction of said liquid crystal layer, and a difference between a maximum pitch and a minimum pitch thereof is made at least 100 nm.

12. The reflective cholesteric filter according to claim 11, wherein a pitch of a molecule helix in said liquid crystal layer is made such that the circularly polarized light reflection wavelength bandwidth is in the range 400 to 800 nm.

13. The reflective cholesteric filter according to claim 11, wherein said liquid crystal layer has a molecule helix pitch such that it minimally reflects circularly polarized light of the colors red, green, and blue.

* * * * *